W. L. CURTIS.
HOOK FEEDING AND ARRANGING MACHINE.
APPLICATION FILED MAY 21, 1909.
1,095,194.
Patented May 5, 1914.
6 SHEETS—SHEET 3.
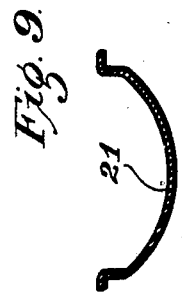
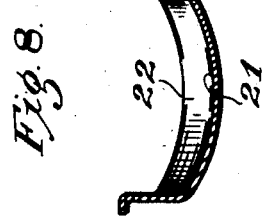
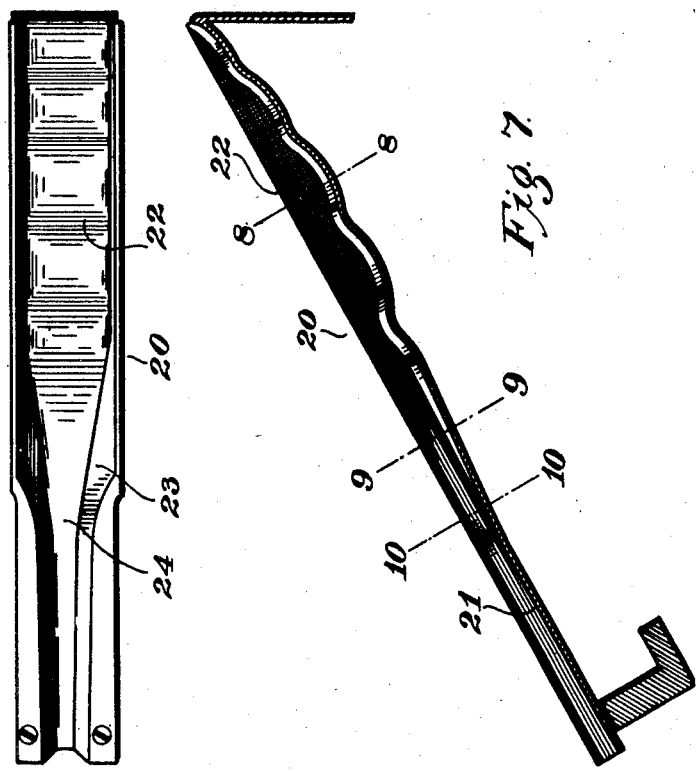
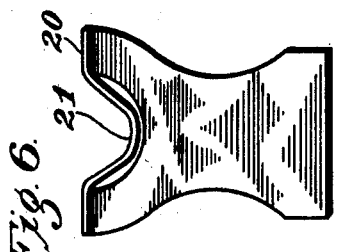
Witnesses:
Leon H. Horner
C. I. Hartnett
Inventor:
Walter L. Curtis
By Southgate & Southgate,
Attorneys

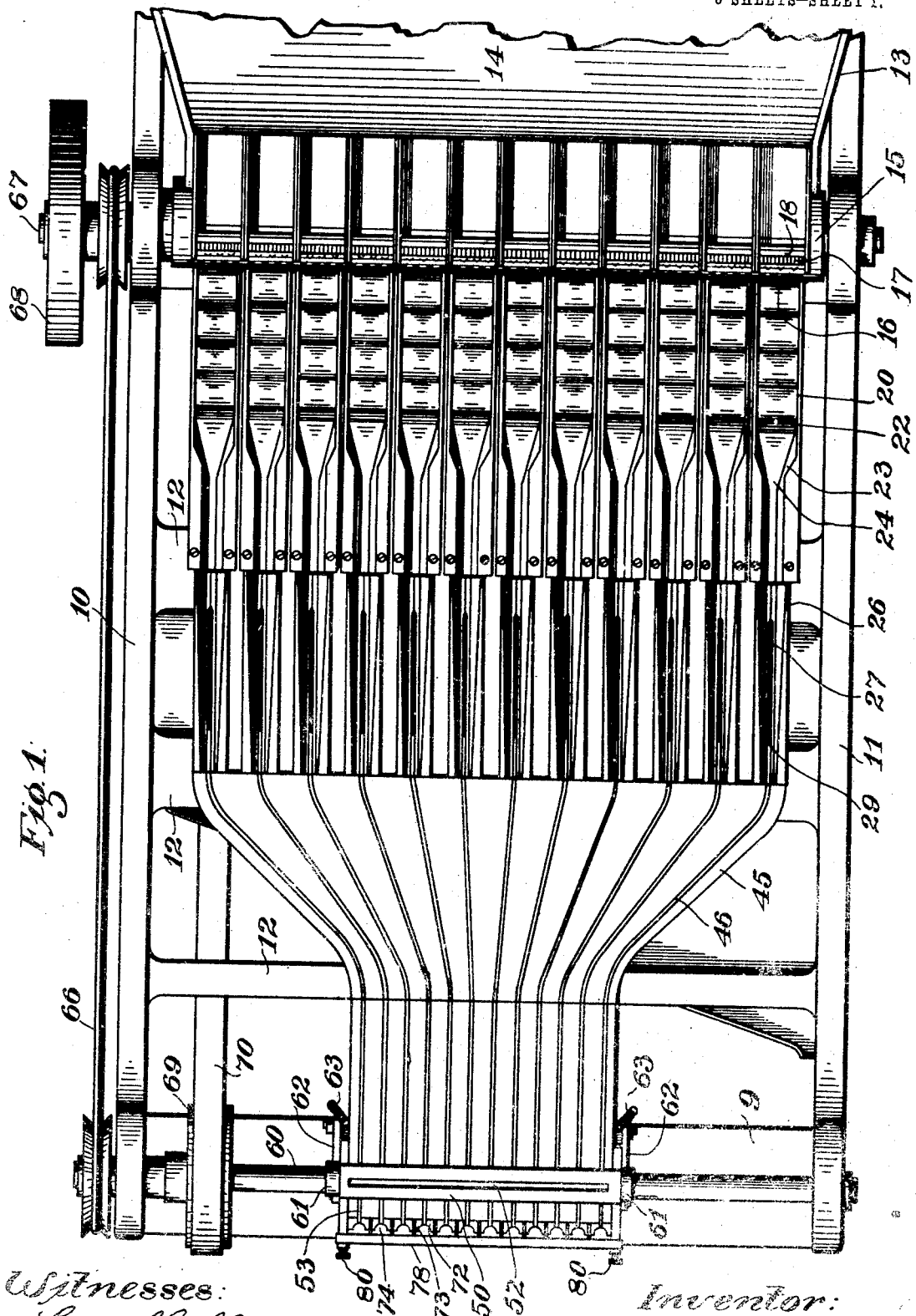

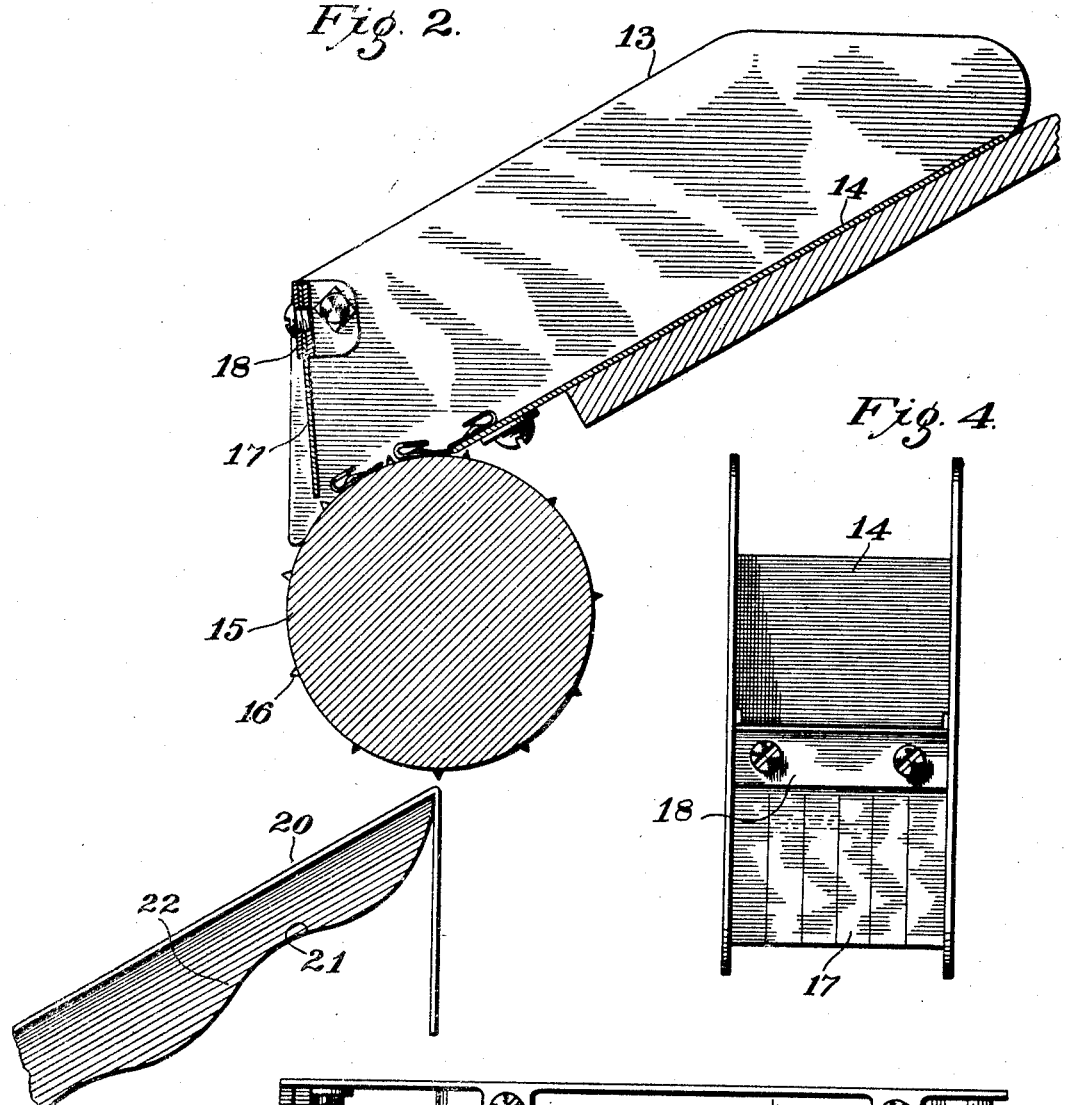

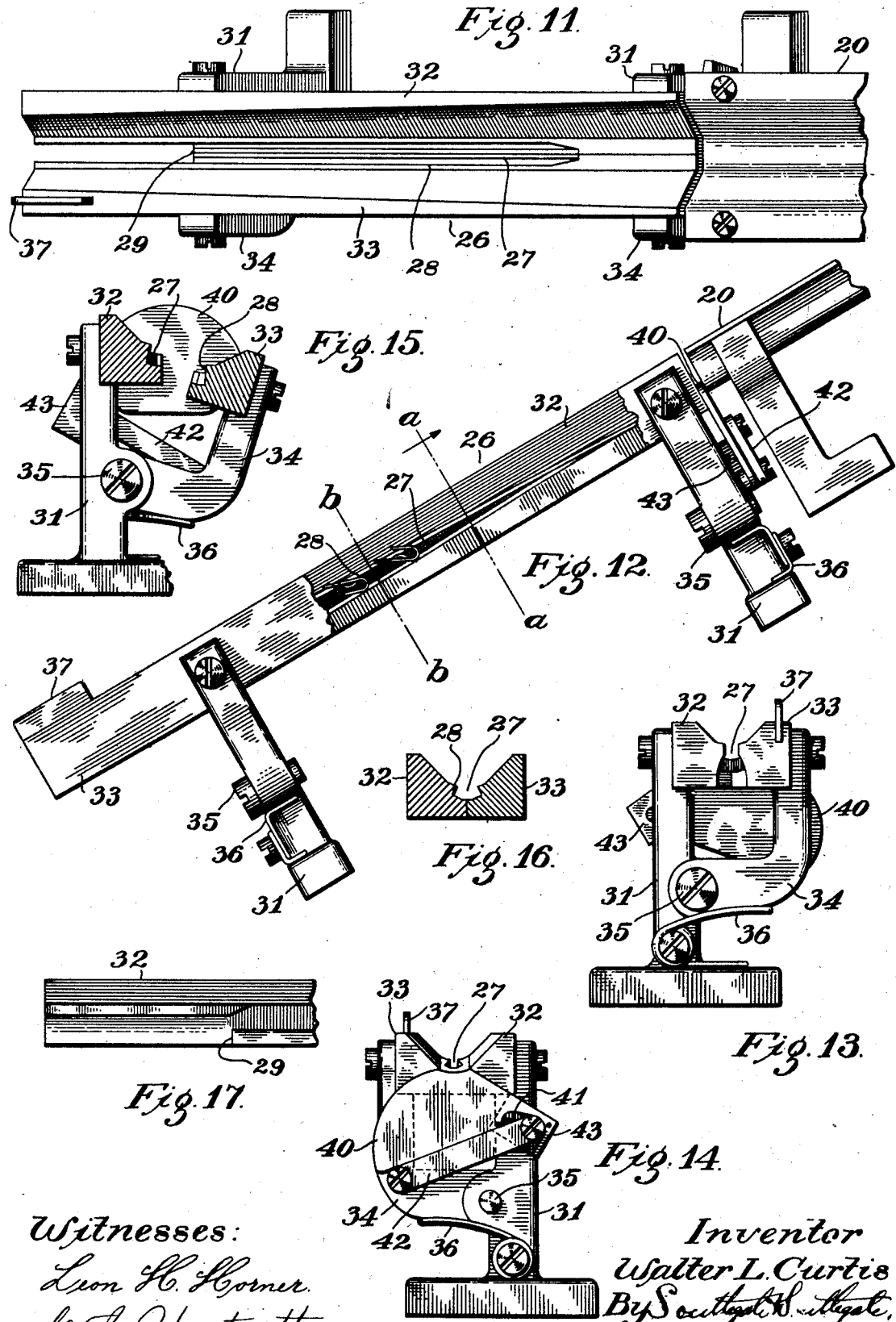

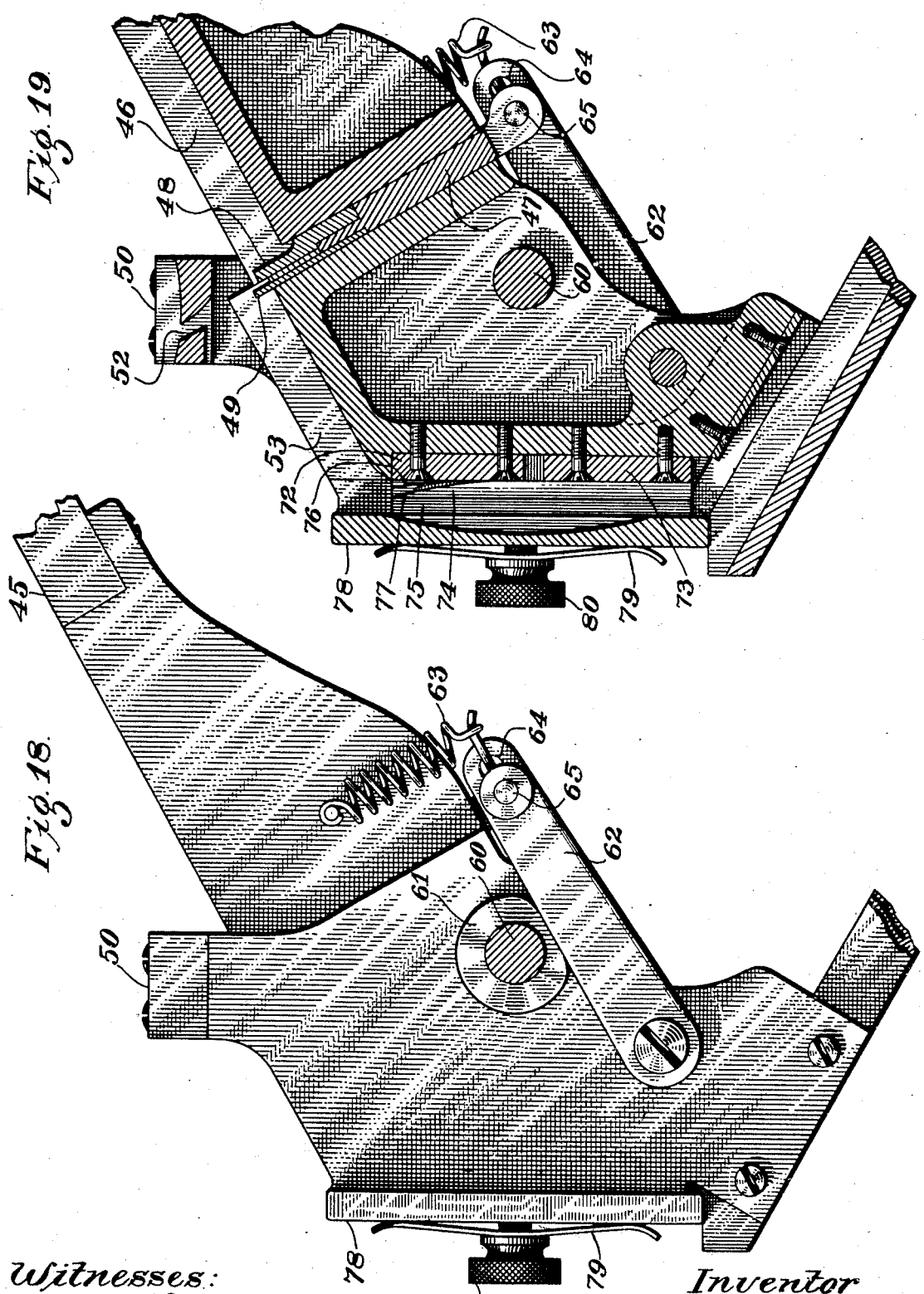

W. L. CURTIS.
HOOK FEEDING AND ARRANGING MACHINE.
APPLICATION FILED MAY 21, 1909.
1,095,194.
Patented May 5, 1914.
6 SHEETS—SHEET 6.
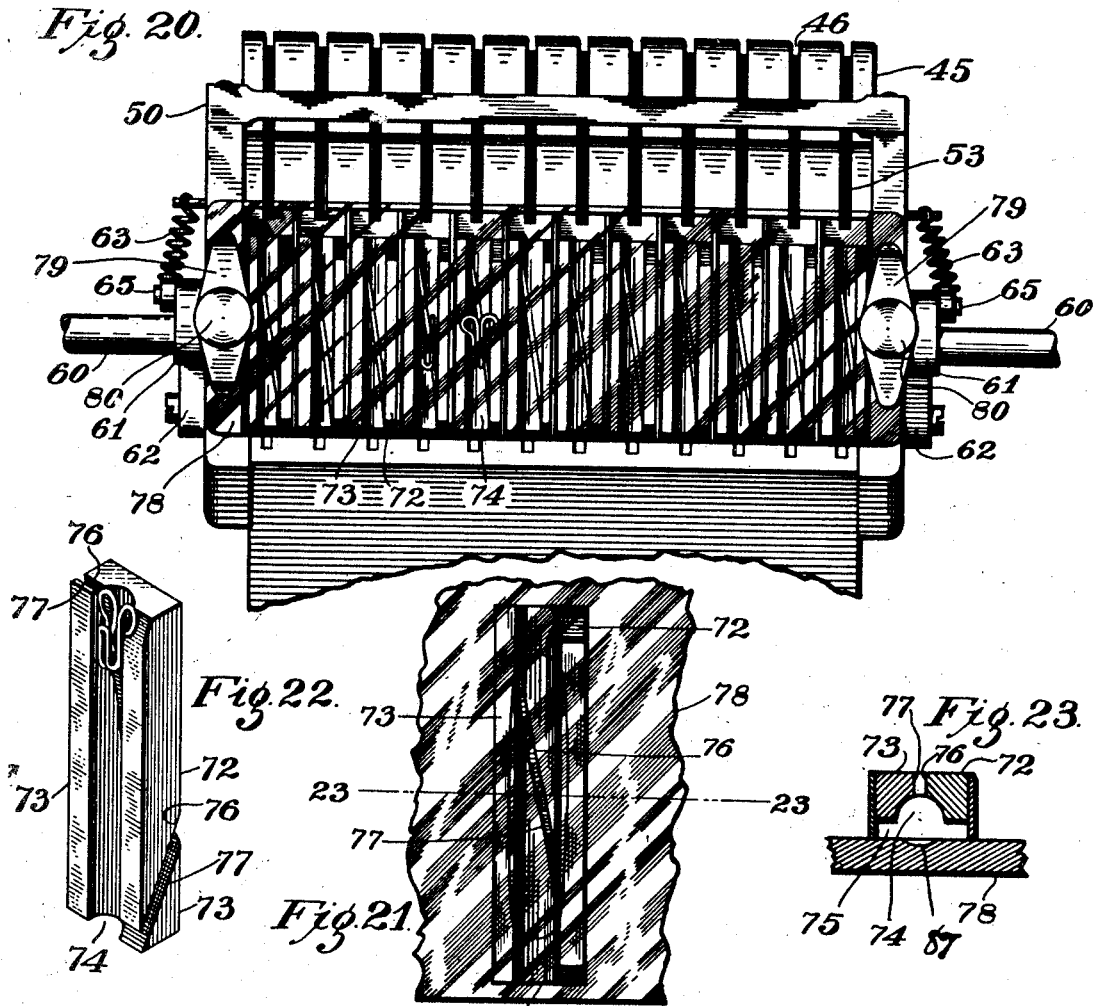
Witnesses:
Leon H. Horner
C. A. Hartnett
Inventor:
Walter L. Curtis
By Southgate & Southgate,
Attorneys.

UNITED STATES PATENT OFFICE.

WALTER L. CURTIS, OF WORCESTER, MASSACHUSETTS, ASSIGNOR TO DE LONG HOOK AND EYE COMPANY, OF PHILADELPHIA, PENNSYLVANIA, A CORPORATION OF PENNSYLVANIA.

HOOK FEEDING AND ARRANGING MACHINE.

1,095,194.  Specification of Letters Patent.  Patented May 5, 1914.

Original application filed March 16, 1908, Serial No. 421,347. Divided and this application filed May 21, 1909. Serial No. 497,466.

*To all whom it may concern:*

Be it known that I, WALTER L. CURTIS, a citizen of the United States, residing at Worcester, in the county of Worcester and State of Massachusetts, have invented a new and useful Hook Feeding and Arranging Machine, of which the following is a specification.

This is a division of my application for a patent on a machine for assembling hooks and eyes and attaching them to cards, filed March 16, 1908, Serial No. 421,347, and this invention relates to a machine for feeding hooks or similar articles from a hopper in which they are received in bulk into a chute or the like, and at the same time causing them automatically to be arranged in a predetermined position.

The principal objects of the invention are to provide means whereby the hooks or the like will be fed out of the hopper in which they are first received in a substantially continuous downward path without the necessity of raising them in the hopper; to provide means for receiving them from the hopper and feeding them forward in such a way as gradually to get most of them into a position with the hooks forward either on their backs or faces; then to provide means for gradually dropping the points of the hooks down while the outwardly extending eyes thereof are utilized as shoulders to hold them continuously in a more and more nearly vertical position; to provide means for thereafter receiving the hooks from the chute in which they are left in nearly vertical position, preferably raising them up and feeding them forward into a reversing device which will feed forward those that come with the hooks in certain position without changing the position thereof, and will reverse all the others so that all of the hooks received will be delivered from the machine in the uniform position thus avoiding the waste necessitated by those machines which throw out those not received in proper position; also to provide means whereby a plurality of series of hooks or the like can be operated upon at the same time, all being received preferably from the same hopper, thus greatly increasing the output thereof.

Reference is to be had to the accompanying drawings which illustrate a preferred embodiment of the invention designed for feeding hooks, and in which—

Figure 1 is a plan of a portion of the hook receiving and arranging mechanism in accordance with this invention. Fig. 2 is a longitudinal sectional view of the same. Fig. 3 is a plan of the same. Fig. 4 is an end view of certain mechanism shown in Fig. 2. Fig. 5 is a plan of a chute for arranging the hooks with their axes in parallel lines. Fig. 6 is an end view of the same. Fig. 7 is a longitudinal sectional view of the same. Figs. 8, 9 and 10 are transverse sectional views on the lines 8, 9 and 10 respectively, of Fig. 7. Fig. 11 is a plan of one of a series of chutes for bringing the hooks into vertical position. Fig. 12 is a side elevation of the same partly broken away to show interior construction. Figs. 13 and 14 are views of the opposite ends of the same. Fig. 15 is a sectional view of the line $a$—$a$ of Fig. 12. Fig. 16 is a sectional view of the line $b$—$b$ of Fig. 12. Fig. 17 is a fragmentary side view of portion of the same device. Fig. 18 is an enlarged side elevation of the lower end of the hook arranging mechanism. Fig. 19 is a longitudinal sectional view taken on the line at the rear of the side shown in Fig. 18. Fig. 20 is an end elevation of the same. Fig. 21 is a fragmentary enlarged end elevation of one of the chutes for turning the hooks around. Fig. 22 is a perspective of the principal part of one of said chutes. Fig. 23 is a sectional view of the same on the line 23 of Fig. 21. Figs. 24, 25 and 26 are views of three sides of one of the parts of the hook turning chute, and Figs. 27, 28 and 29 are similar views of the other part thereof.

The drawings illustrate the invention as embodied in the machine which is provided with a table 9 carrying brackets or uprights 10 and 11 which support an inclined frame 12 carrying the hook-receiving, arranging and feeding device. The hooks are shoveled into, or otherwise supplied indiscriminately to, a hopper 13 having an inclined bottom 14 which has an opening at the lower end thereof into which projects slightly a drum or cylinder 15. This cylinder is provided with small pointed projections 16 on its surface, which during its rotation, engage the hooks so as to carry them with it out of the hopper under a front wall 17 in a substantially continuous downward path without materially lifting them in the hopper. This front wall preferably comprises a series of resilient metallic strips which are adapted to yield slightly to permit the hooks to be forced out, but which extend near enough to the cylinder to prevent the hooks being discharged except when carried thereby. This wall is fixed to a cross bar 18 in any desired way as for example, by means of screws.

The hooks discharged from the cylinder drop into the top of a chute 20 located below it. This chute is provided with an inclined bottom 21 having a series of corrugations or wavy irregularities 22 beginning at the upper end in slight curves and gradually increasing toward the center of the chute for the purpose of turning the hooks as they descend along the same by gravity, to turn most of them on their backs in such position that their bills are on top. The lower one of these corrugations curves gradually into the lower straight part, of the inclined bottom 21. From the upper end of this straight part, inclined sides 23 extend upwardly and gradually converge so as to provide a narrowing passage 24. On account of the nature of the manner in which the hooks pass over the irregular part 22 of the bottom of the chute, they will generally be arranged with their bills up when they enter the narrowing passage 24 between the inclined walls 23 which will bring them mostly into longitudinal alinement and consequently they will drop from the lower end of this chute on the top of an inclined chute 26 in alinement but some of them will have their bills forward and some will be located in the opposite position. This chute is provided with a depressed passage way 27 having a ledge 28 rising gradually on either side thereof. Most of the hooks are fed into this chute in such position that the shoulders will ride along down the ledges 28 and the bills will swing down into the depressed passage way. As the angle between the bottom of the passage-way and the top of the ledge 28 increases during the descent of hooks, it will be seen that the hooks are gradually brought to an inclined position, supported as they are by their shoulders, with their bills hanging down, some of them extending forward and some backward. This gradual lowering of the bills avoids swinging them when their positions change, and thus their possible displacement. At the lower end of this chute the bottom is cut away at the point 29 so as to permit the bills to project down through and hang vertically. It will be noticed that the passage-way 27 and the distance between the ledges 28 gradually narrows from the upper end of the chute to the lower end so as to bring the hooks in alinement at the lower end. If any of the hooks enter this chute in such position that the two shoulders will not engage the ledges 28 they will descend through the passage 29 and drop out into the frame 12 below, which has an inclined bottom so as to receive any hooks dropped from any part of the device, above, and deliver them into a receptacle from which they may be returned to the hopper. This chute 26 is supported on brackets 31 mounted on the frame 12. In order to provide for discharging the hooks from this chute in case of any clogging of the same by a too rapid feed of the hooks or for any other reason, each of these chutes is constructed in the form of a pair of jaws 32 and 33. The jaw 32 is fixed on the brackets but the jaw 33 is mounted on swinging arms 34 pivoted on studs 35. Springs 36 are provided for normally holding the arms up in such position as to close the chute and permit it to work in a normal manner. When it is desired to open any one of the chutes, however, it is merely necessary to touch a plate 37 with which each of the movable jaws is provided to swing the jaw back, as indicated in Fig. 15 and permit the hooks to drop out into the bottom of the frame 12. When this is done, it is desirable to provide means for preventing hooks descending into this chute from the chute above and for this purpose each of the chutes is provided with a gate 40 at the head end thereof. This gate is mounted to swing on a stud 41 and is operated by the movement of the swinging jaw. For this purpose a link 42 is pivotally connected with the upper arm 34 and with an arm 43 projecting from the gate. When the jaw 33 is swung outwardly, the link 42 is pulled by the arm 34 so as to swing the gate upwardly, as indicated in Fig. 15. The hooks being now in vertical position as indicated above, descend through the end of the chute 26 into a raceway 45 which comprises a series of channels 46 which converge throughout part of their length and at the end of each of which the hooks bring up against the end of a sliding stop 47. This stop is provided with a series of projections 48 each adapted to engage the front hook in one channel and each adapted to support the lower end of a hook on its upper surface. In front of these projections and spaced therefrom are higher projections 49 adapted to engage the front surfaces of the hooks when the latter are held on the top of the projections 48 until the sliding stop is withdrawn to a position a little below that shown in Fig. 19. At this time the top surfaces of the projections 48 are even with the bottom of the race-way 45, and consequently the hooks are fed by gravity along the race-way until the first hook rests on the top of the projection 48, its further progress downward being arrested by the higher projection 49.

A bar 50, which is preferably stationary, extends across the top of the race-way so that when one of the hooks is in position on the top of the projection 48, and the sliding stop 47 is forced upwardly, the top of said hook which is now resting on the sliding stop will be projected into a slot 52 in the cross bar 50. Then when the sliding stop is withdrawn to bring the projection 49 below the lower surface of a guide-way 53 the lower side of the hook slides downwardly over the projection 49 and into the guide-way 53 without being interfered with by the sliding stop or the hooks behind. The sliding stop 47 is operated by means of a cam shaft 60 having a cam 61 on each end thereof. These cams operate a pair of arms 62 pivoted to the frame and having springs 63 to oppose the cams. Each of these arms has a slot 64 connected with the sliding stop 47 by a pin 65. It may be stated at this point that the shaft 60 may be operated in any desired way but is shown as being turned by a belt 66 upon a pulley on the shaft 67 on which the drum 15 is mounted, this shaft having a driving pulley 68. It may also be stated that the shaft 60 is shown as having a pulley 69 driving a belt 70 adapted to operate an eye-hopper, not shown.

Although only one of the courses for the passage of the hooks has been described, it will be understood that the machine preferably is constructed with a plurality of such courses, twelve being shown in the drawings. When a hook in each course is discharged from the race-ways 45, as above described, it is left standing in vertical position in an inclined race-way 53. This permits the hook to descend into a vertical passage which is made up of two guide-pieces 72 and 73 located adjacent to each other to form the back side of the guide-way and having a passage 74 down which the bill of the hook may fall when the hook enters the top of the guide-way in proper position therefor. In this case, the back of the hook and its shoulders fall straight down through a guide-way 75. If, however, the hook is presented in the opposite direction with its bill forward, one of these shoulders will engage a curved and slanting surface 76 on the piece 72 and be guided between that and a correspondingly-shaped curved surface 77 on the other guide piece to turn the hook half way around and cause its bill to be presented at the back when it reaches the bottom of the guide-way. This series of vertical guide-ways which constitute devices for turning the hooks around so as to locate their bills all in the same direction, are provided with a front plate 78 which is preferably of glass as indicated in the drawings so that the attendant may see how the hooks are dropping through it. It has notches 87 opposite the passages 74 to permit the hooks to be turned. This glass plate has springs 79 upon which bear screws 80 adapted to be adjusted to regulate the pressure of the springs on the glass plate. If the attendant observes that the guides behind this plate are clogged up, it is a very simple matter to touch the top of the plate and thus release the hooks and clear the guide-ways.

While I have illustrated and described my invention as applied particularly to the feeding and arranging hooks and while I have illustrated a particular form in which the invention can conveniently be embodied, it is to be understood that the invention is not limited to its use for feeding these particular articles, and that many modifications in the mechanism can be made by any person skilled in the art without departing from the scope of the invention as expressed in the claims.

Having thus fully described my invention, what I claim is:—

1. In a machine for feeding hooks and the like, the combination of an inclined hopper having an inclined bottom and a wall closing the lower end of the hopper said bottom having an opening in its lower end, of a rotary wheel journaled on an axis directly below said opening projecting at its top into said opening, extending under said lower end of the hopper, and having means thereon for feeding the contents of the hopper out in a continuous downward path under said end wall.

2. In a machine for feeding hooks and the like, the combination of an inclined hopper having an inclined bottom and a wall closing the lower end of the hopper said bottom having an opening in its lower end, of a rotary wheel journaled on a transverse axis directly below said opening projecting at its top into said opening, extending under said lower end of the hopper, and rotatable in such a direction that articles which slide down said bottom will be carried continuously downward substantially in a straight path until they come out under the bottom of the end wall.

3. In a machine of the class described, the combination of a hopper having an inclined bottom with an opening at the lower end, means projecting through said opening for feeding articles from the hopper, and a movable wall extending across the end of the hopper adjacent to said feeding means, for engaging the hooks as they are fed out of the hopper.

4. In a machine of the class described, the combination of a hopper having an inclined bottom with an opening at the lower end, means projecting through said opening for feeding articles along in the hopper, a wall extending across the end of the hopper adjacent to said feeding means, said wall comprising a plurality of resilient tongues adapted to retain the articles in the hopper but to yield when said articles are fed by the feeding means, and a chute for receiving the articles from the hopper.

5. In a machine of the class described, the combination of a hopper having a bottom with an opening at the end, means projecting through said opening for feeding articles along in the hopper, a wall extending across the end of the hopper adjacent to said feeding means, said wall comprising a plurality of downwardly extending resilient tongues adapted to retain the articles in the hopper but to yield when said articles are fed by the feeding means.

6. In a machine of the class described, the combination of a hopper for receiving hooks, said hopper having a front end provided with yielding sections, means for positively feeding the hooks against said yielding sections, and discharging them from the hopper, and a chute located below the hopper for receiving the hooks therefrom, said chute having a corrugated bottom.

7. A chute for feeding hooks or the like having an inclined bottom provided with curved wavy depressions at its upper end adapted to feed solid articles by gravity and having reversely curved projections between them.

8. A chute for feeding hooks and the like having a generally inclined bottom provided above the lower end thereof with a generally concave portion having gradually curved depressions and intermediate curved projections, the length of the upper depressions being less than that of the lower ones.

9. A chute having a generally inclined bottom provided with corrugations at its upper end, the upper corrugations being narrower than the lower ones and having a straight slanting portion connected with the lowest corrugation said slanting lower portion being gradually contracted toward the bottom of the chute.

10. A chute for feeding hooks and the like having an inclined bottom, with corrugations at the top thereof, the lower part being smooth and gradually contracted to form a narrow neck whereby the hooks will be fed from the neck in substantial alinement with each other.

11. A chute for feeding hooks and the like having an inclined bottom with corrugations at the top thereof, the lower part being smooth and being gradually contracted to form a narrow neck whereby the hooks will be fed from the neck in substantial alinement with each other, in combination with a chute for receiving the hooks from said neck, said last named chute having a ledge on each side thereof adapted to receive the shoulders of the hooks and support them with their bills depending between said ledges.

12. A chute for feeding hooks or the like comprising a passage-way having ledges on the sides thereof, and a gradually depressed bottom between said ledges, said ledges being adapted to receive the shoulders of the hooks and the bottom the bills thereof, whereby the hooks will be gradually brought to an upright position in said chute.

13. A chute for feeding hooks or the like, comprising a passage-way having ledges on the sides thereof, and a gradually depressed bottom between said ledges, said ledges being adapted to receive the shoulders of the hooks and the bottom the bills thereof, whereby the hooks will be gradually brought to an upright position in said chute, the bottom being cut away at the lower part of the chute to permit the hooks to hang freely from their shoulders and to permit any hooks not supported by said ledges to be discharged from said chute.

14. In a machine of the class described, the combination of a hopper, means for feeding hooks from the hopper, a chute for receiving said hooks having means for arranging them generally in alinement and feeding them downward, a second chute for receiving the hooks from the first chute, having means for arranging them in an upright position and discharging all those not received in alinement with each other from the preceding chute, and means for guiding the hooks which are delivered with their bills in one direction and for simultaneously reversing the hooks which are presented with their bills in the other direction.

15. In a machine of the class described, the combination of a chute for receiving articles having means for arranging said articles generally in alinement with each other, and a second chute having means for receiving the articles from the first chute and arranging the articles first in an inclined position and afterward gradually bringing them to a substantially upright position with their lower ends depending.

16. As an article of manufacture, an inclined chute for receiving hooks on their faces and backs, having supports for their shoulders, and an intermediate support for their bills which gradually drops away from the shoulder supports, whereby the bills are gradually dropped down.

17. In a machine of the class described, the combination of a chute for receiving articles having means for arranging said articles generally in alinement with each other, and a second chute for receiving the articles from the first having means for arranging the articles first in an inclined position and afterward in a vertical position during their travel therethrough, and means for receiving the articles from the second chute and feeding forward those which enter it in one direction without changing their position and for reversing the position of all the others.

18. In a machine of the class described, the combination of an inclined chute for receiving hooks in a flat position, means for gradually dropping their bills down as they descend along the chute, and supporting them from above by their shoulders, and a movable stop for engaging the hooks and feeding them forward one by one.

19. In a machine of the class described, the combination of a feed device having means for receiving hooks in a flat position, gradually dropping their bills down, and supporting them from above by their shoulders while they are descending therethrough, a movable stop for engaging the hooks and feeding them forward one by one, a race-way for receiving the hooks when fed forward by the stop, and means for turning part of the hooks around so as to bring them all into the same position.

20. In a machine of the class described, the combination of a race-way having a series of channels for hooks, means for simultaneously feeding the hooks into all of said channels one by one, and means associated with the said channels for feeding forward all the hooks which enter it and for causing the bills of all hooks to extend in the same direction when delivered therefrom.

21. A guide for a machine of the class described, comprising two vertical separable members each having a curved surface, said curved surfaces being spaced from each other, but of complementary shape providing between them a slanting passage extending through an arc of 180 degrees from the top to the bottom of the guide.

22. A guide for a machine of the class described, comprising a plurality of members each having a curved surface, said curved surfaces being spaced from each other, but of complementary shape so as to provide a slanting passage extending through an arc of 180 degrees from the top to the bottom of the guide and a plate on the front of the passage having a notch therein for permitting the hooks to be turned.

23. In a machine of the class described, the combination of a vertical guide having means for permitting hooks to pass through it when presented in proper position therefor, and means for turning all other hooks though an arc of 180 degrees during their descent through said guide, a series of adjacent guides for receiving a plurality of series of hooks from said vertical guides, and means for simultaneously taking one hook from each of said adjacent guides and feeding it downwardly.

24. In a machine of the class described, the combination of an inclined race-way having a plurality of channels, means for feeding one hook at a time into each channel, a vertical guide for receiving the hooks from said race-way comprising a plurality of means for receiving the hooks and feeding certain of said hooks downwardly without changing their position and for turning the remainder of the hooks around to bring all of them into the same position, a series of adjacent guides for receiving the hooks from the vertical guide, and means for simultaneously taking one hook from each of said adjacent guides.

In testimony whereof I have hereunto set my hand, in the presence of two subscribing witnesses.

WALTER L. CURTIS.

Witnesses:
A. E. FAY,
C. F. WESSON.